Figure 1:
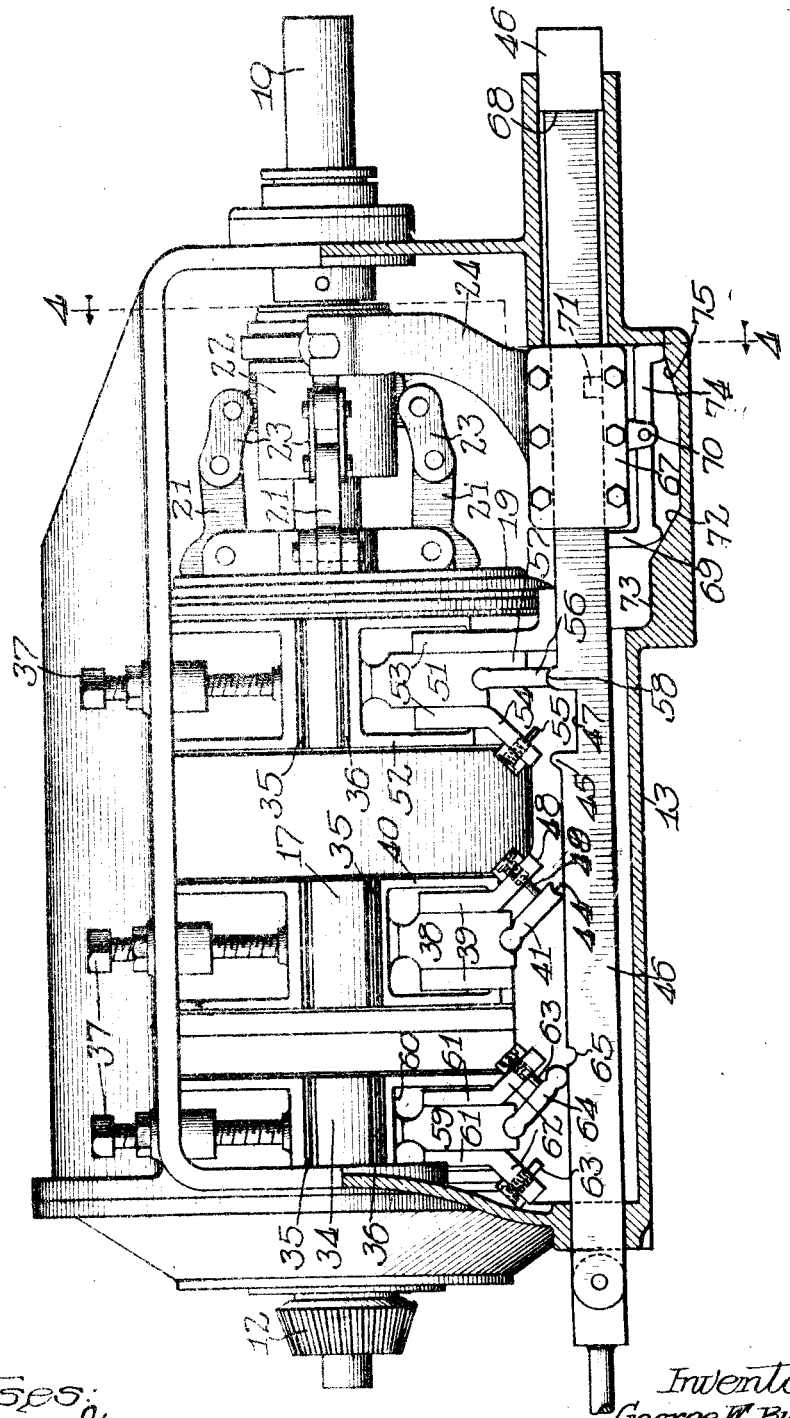

G. W. BULLEY.
TRANSMISSION GEARING.
APPLICATION FILED JUNE 3, 1912.

1,075,328.

Patented Oct. 14, 1913.
3 SHEETS—SHEET 1.

Witnesses:
H. W. Dsmarus Jr.
P. Burkhardt

Inventor:
George W. Bulley
By Brown & Hopkins
Attys

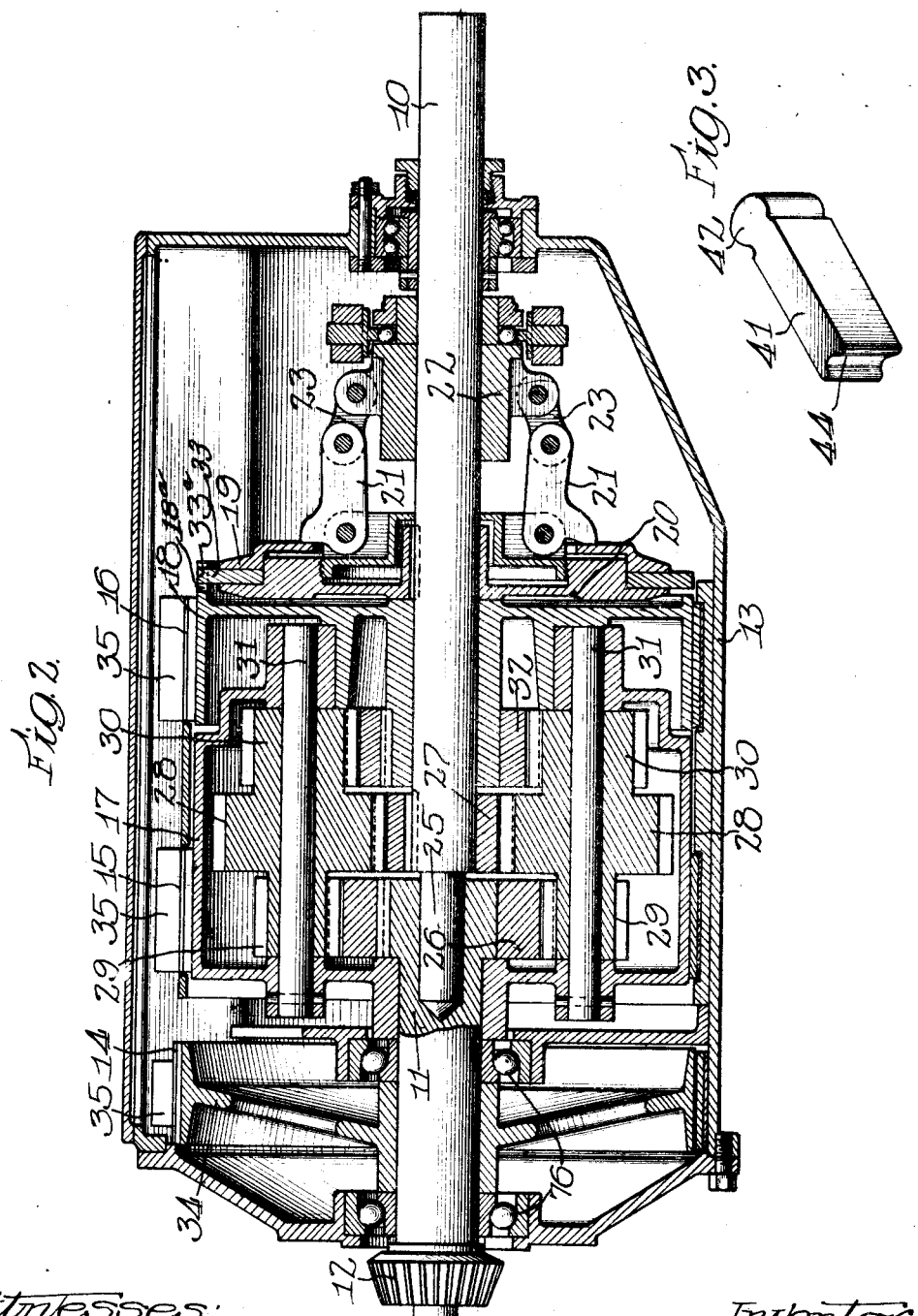

G. W. BULLEY.
TRANSMISSION GEARING.
APPLICATION FILED JUNE 3, 1912.
1,075,328.
Patented Oct. 14, 1913.
3 SHEETS—SHEET 3.
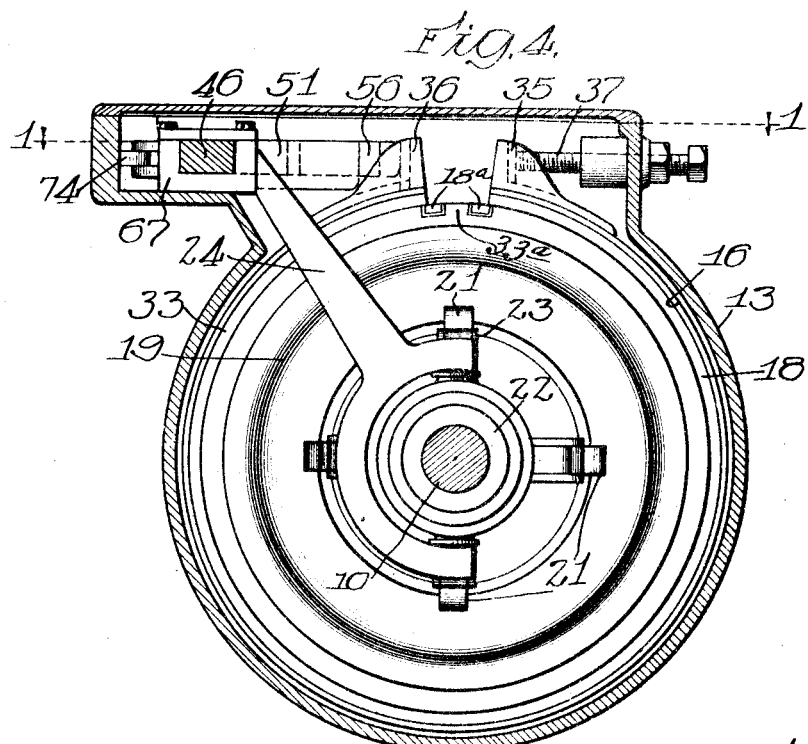
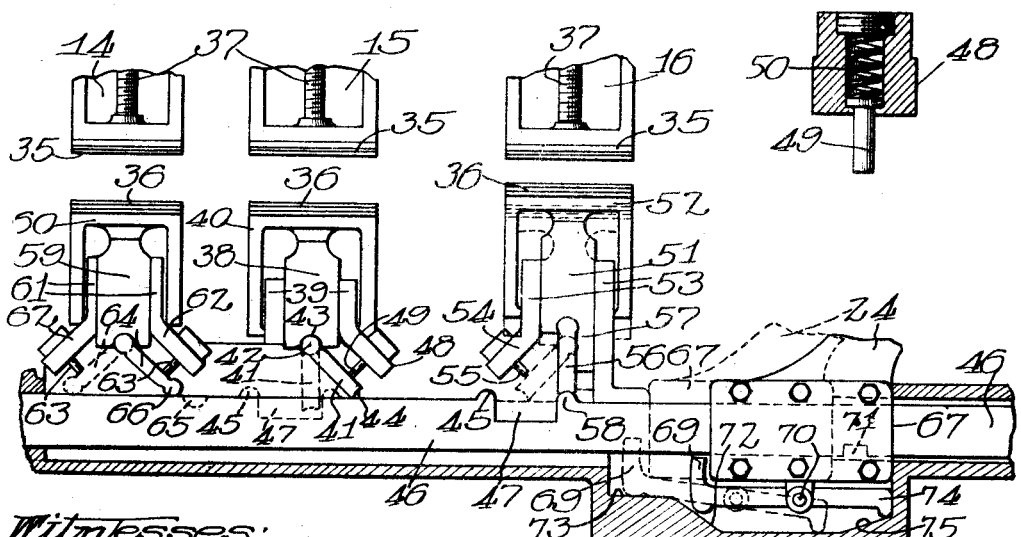

UNITED STATES PATENT OFFICE.

GEORGE W. BULLEY, OF CHICAGO, ILLINOIS, ASSIGNOR TO THE MERCURY MANUFACTURING COMPANY, OF CHICAGO, ILLINOIS, A CORPORATION OF ILLINOIS.

TRANSMISSION-GEARING.

1,075,328.   Specification of Letters Patent.   Patented Oct. 14, 1913.

Application filed June 3, 1912. Serial No. 701,146.

*To all whom it may concern:*

Be it known that I, GEORGE W. BULLEY, a citizen of the United States, residing at Chicago, in the county of Cook and State of Illinois, have invented certain new and useful Improvements in Transmission-Gearing, of which the following is a specification.

This invention relates to improvements in transmission gearing of the type shown and described in my application Serial No. 611,249, filed February 27, 1911, and more particularly to the speed changing mechanism and the mechanism for changing the direction of drive employed in connection with such gearing.

In the present invention the change of speed is obtained by tightening some suitable form of clutching or gripping mechanism which renders active certain gears or elements of the transmission mechanism of the respective speeds or direction of drive desired.

More particularly the present invention relates to the controlling mechanism for making the desired changes and the provision of means whereby a brake will be applied to the driven shaft or element when changing from one drive to another, such as from the low speed to the reverse or vice versa, thereby rendering it impossible to pass from one to the other by shifting the controlling lever without stopping the driven shaft or element.

To the attainment of these ends and the accomplishment of other new and useful objects as will appear, the invention consists in the features of novelty in substantially the construction, combination and arrangement of the several parts hereinafter more fully described and claimed and shown in the accompanying drawings, exemplifying the invention, and in which—

Figure 1 is a plan section of a transmission gearing constructed in accordance with the principles of this invention, taken on line 1—1, Fig. 4. Fig. 2 is a central sectional view of the speed changing and reversing mechanism, parts being omitted. Fig. 3 is a perspective view of a detail. Fig. 4 is a sectional view on line 4—4, Fig. 1. Fig. 5 is an enlarged detail view in plan section of parts to be hereinafter described. Fig. 6 is a sectional view of a detail.

Referring more particularly to the drawings, the numeral 10 designates a driving shaft and 11 a driven shaft, which latter transmits its motion to the load or work in any suitable manner, such as by means of a gear 12 carried by the shaft.

The mechanism is housed within a casing designated generally by the reference numeral 13, and 14, 15 and 16 designate friction bands or clutching bands of an ordinary planetary transmission gearing, all of which may be of the ordinary and well known construction. In gearing of this type the rotation of the shaft 10 is imparted to the driven shaft 11 either directly when the clutch elements connected respectively with the driving and driven elements are locked together, or indirectly through a train or through one of a plurality of separate trains of gears, which latter are capable of imparting different speeds to the driven shaft 11 from the constant speed shaft 10 when one or the other of the clutch bands 15, 16 is tightened on the respective drums 17, 18 with which they coöperate.

In the present form of the invention there is shown a clutch for establishing a direct connection between the driving and driven shafts 10, 11, but it is to be understood that any form of clutch which will accomplish this result may be employed. In the present form, however, the clutch element 19 coöperates with the clutch element 20, which latter is secured to the driving shaft 10, and the element 19 is forced into frictional connection with the element 20 through the medium of levers 21, connected to a sliding collar 22 on the drive shaft 10, preferably by means of suitable links 23, so that when the collar is pushed in one direction on the shaft the clutch will be applied or locked and when shifted in the opposite direction it will be released. The collar is moved upon the shaft 10 by means of a shifter 24, which may be of any suitable form in construction, and the shifter is operated in a manner which will be hereinafter described.

Within the gear housing 13 (reference being had more particularly to Fig. 2) the extremity of the drive shaft 10 is preferably reduced in diameter as at 25, and carried on this reduced portion is an independent sleeve which constitutes the driven shaft 11. Carried by the inner end of the shaft 11 is a pinion 26, and adjacent this pinion is another pinion 27 of smaller diameter which is keyed to the driving shaft 10. These two pinions are constantly in mesh with a plurality of groups of planetary gears. The groups of gears are each composed of three pinions of different diameters 28, 29 and 30, all integrally connected together and mounted on respective shafts 31, which are journaled in the rotatable drum 17. The gears 28 and 29 of these planetary groups mesh with the shaft pinions 27, 26 respectively, and the gears 30 mesh with the pinion 32, carried on the hub of the rotatable reversing drum 18. This structure is designed for two speeds forward and one reverse, and as before stated, these speed changes are brought about by the clutches or gripping bands 15, 16. It will be manifest that by moving or actuating the band 15 and thereby holding the drum 17 against rotation, the shafts 10 will drive the shaft 11 in the same direction through the medium of the gears 27, 28, 29 and 26, but at a slower speed on account of the different diameter of the pinions. Reverse speed is, as is clearly seen, accomplished by actuating the band 16 to hold the drum 18 against rotation when the drum 14 is released and free to rotate. In this case the gear 32 is held stationary, and the planetary pinions are, as is well understood, caused to rotate bodily in reverse direction to that of the shaft 10 and thereby drive the shaft 11 in a corresponding reverse direction, the speed of reverse rotation of the shaft 11 corresponding to the difference between the speed imparted to the planetary pinions by the gears 27 and the shaft pinion 32.

In order to drive the shaft 11 at the same speed forward as the drive shaft 10, the clutch embodying the elements 19 and 20 is used. In this structure the element 20 is fastened to the shaft 10 in any suitable manner for rotation therewith, and when the collar 22 is shifted, the element 19 is forced against a friction member 33 disposed between the elements 19 and 20, and having peripheral teeth or lugs 33ª adapted to engage with corresponding teeth 18ª on the periphery of the drum 18, so that all of the parts will be locked to the shafts 10 and 11.

The brake band 14 coöperates with a drum 34, and this drum 34 is connected for rotation with the shaft 11 so that when the bands 15, 16 are released and the band 14 applied in a manner to be hereinafter set forth, the shaft 11 will be unlocked with respect to the shaft 10 and the former will be held against rotation.

All of the bands 14, 15, 16 are of the same construction, and therefore the specific description of one will apply equally as well to them all. Secured to the extremities of each of the bands are lugs 35, 36 arranged sufficiently far apart to permit of radial expansion and contraction of the band. One of these lugs, the lug 35, is adjustably held in position by means of an adjusting device 37, such as a screw or the like, which passes through a part of the casing 13 with its inner end engaging the lug 35. The opposite lug 36 is the one which is acted upon to cause the band to be contracted upon its drum. For each speed change one of these bands is usually required. In the present invention only one band is shown as only one speed is employed. Another band, however, is employed for the reverse drive and a third band is employed as a brake, consequently when one of the bands 15, 16 is tightened, a reverse direction will be given to the driven shaft 11, the band 16 being the reversing band, the band 15 is the speed-changing band, while the band 14 is the brake band. The means for tightening either of these bands at will constitutes a portion of this invention and will now be described.

In the present form of the invention the low speed band is preferably disposed between the reversing and the brake bands, and arranged adjacent the lug 36 of the low speed band 15 is a sliding member 38, mounted for movement in suitable guides 39, and a head 40 engages the lug 36 and is itself engaged by the member 38. This member 38 and head 40 are adapted for free back and forth movement with the lug 36, and connected to the outer end of the member 38 for free pivotal movement is a dog 41, which is preferably removably connected to the member 38 by means of a head 42, which engages in a corresponding recess in the end of the member 38. The free end of the dog 41 is preferably rounded or recessed at 44 so as to be engaged by a cam or projection 45 carried by a sliding rod 46, and the dog 41 is so constructed that when the cam or projection 45 engages in the curved or recessed portion 44 the dog will be swung about its point of pivotal support by the movement of the rod 46 in one direction to force the member 38 and the head 40 in a direction to tighten the band 15 on the drum 17. A continued movement of the rod 46 in the same direction, or to the left in Fig. 5, will cause the dog 41 to swing past its central position and the cam or projection 45 will pass out of engagement with the extremity of the dog 41, thereby permitting the elasticity of the band 15 to expand the band and release the drum. The rod 46 is provided with a recess 47 adjacent one edge of which the cam or projection 45 is arranged, and this recess 47 is adapted to assume a position with respect to the dog 41 when the latter is moved out of its central position by the movement of the rod 46 to the left in Fig. 5, so as to receive the extremity of the dog 41, for a purpose to be hereinafter described, and as shown in dotted lines in Fig. 5.

In order to limit the movement of the dog 41 in one direction, when the rod 46 is returned to its normal position, or to the right from its dotted position as shown in Fig. 5, one of the guides 39 is provided with an extension 48, which supports a cushioning member 49 controlled by an elastic member 50, and which cushioning member is adapted to be engaged by the dog 41, as shown in Fig. 5.

Arranged adjacent the outer side of the lug 26 of the reversing band 16 is a member 51 similar to the member 38, and which coöperates with a head 52 similar to the head 40. Guides 53 are provided in which the member 51 moves, and one of the guides 53 is provided with a stop 54 which holds a cushioning device 55 for limiting the movement of the dog 56 in one direction, and which dog 56 is similar to the dog 41, and is connected to the member 51. The member 51 is provided with an extension 57, which limits the movement of the dog 56 in one direction. A cam or projection 58 is provided on the rod 46, which is adapted to engage the extremity of the dog 56 to shift the member 51 and head 52 when the rod 46 is moved in one direction to tighten the band 16, and to move out of engagement with the dog 56 when the rod 46 is moved in the opposite direction to permit the band to release the drum 18.

Arranged adjacent the lug 36 of the brake band 14 is a member 59 similar to the member 38, and which member 59 coöperates with a head 60 similar to the head 40. Guides 61 are provided for the member 59, and these guides 61 are provided with extensions 62 for supporting the cushioning device 63, and these cushioning devices are provided for limiting the movement of a dog 64, which is similar to the dogs 41 and 56, and is pivotally connected to the member 59. This dog 64 is shifted by the movement of the rod 46, but in order to permit the parts to be compactly arranged and to permit the rod 46 to move the required distance for controlling the various brake bands, without necessitating the provision of another aperture through the casing, the rod 46 is provided with a recess 65, and the extremity of the dog 64 is rounded as at 66. The dog 64 is of such a length that it will enter the recess 65 when the latter is in a position to receive the extremity 66 of the dog and a movement of the rod 46 will shift the member 59 through the medium of the dog 64 in a manner similar to the manner in which the members 38 and 61 are shifted. It will therefore be manifest that the shifting of the rod 46 controls the respective movements of the members 51, 38 and 59, and consequently the application and the releasing of the respective bands for controlling the different drives and the brake. In order, therefore, to permit these various bands to be tightened at any desired moment or between any of the drives, it is only necessary to locate the cams or projections 44, 58 and the recess 65 so that they will be positioned with relation to their respective dogs to tighten the respective bands at any desired interval or between any desired speeds. In the present invention, however, the cams and recess are so arranged that the brake band will always be applied when the rod 46 is shifted to pass from the reverse drive to the low speed or vice versa. In other words, according to the arrangement as shown in the present invention it will be impossible to pass from the low speed to the reverse or vice versa, without applying the brake band.

Assuming the parts to be in the position shown in Fig. 5, it will be noted that the band on the reverse speed has been tightened owing to the fact that the cam 58 has shifted the dog 61 to such a position that this band will be tightened. The low speed and brake bands will not be applied, but will be loosened owing to the fact that the recess 65 which controls the dog 64 of the brake band has moved away from the extremity 66 of the dog 64, and the cam or projection 45 has moved away from the dog 41 which controls the band 15 as shown in full lines in said figure. Assuming now that the rod 66 is shifted to the left from the full line position shown in Fig. 5, it will be seen that before the cam or projection 45 reaches the dog 41 to engage and shift the latter to tighten the band for low speed, the recess 65 will have assumed a position to receive the extremity of the dog 64, after the cam 58 has passed out of engagement with the dog 56 on the reversing band. A further movement of the rod 46 in the same direction will cause the rod 46 to assume the position shown in dotted lines in Fig. 5 and will shift the dog 64 to tighten the brake band. A still further movement of the rod 46 in the same direction, or to the left when the brake band is applied, will cause the dog 61 to be moved to the dotted position shown in Fig. 5 and the cam or projection 45 to be moved into engagement with the dog 41 to shift the member 38 and apply the low speed band. Should the rod 46 be shifted still farther to the left in order to secure high speed by rendering the clutch elements 19, 20 active, it will be noted that the cam or projection 45 will pass out of engagement with the dog 41 and the recess 47 will be positioned as shown in dotted lines in Fig. 5 to receive the end of the dog 41, and the moment this recess is in this position, the band 15 will expand and the low speed band will be released.

Assuming now that it is desired to release the high speed clutch and apply the low speed or reverse band, the dog 46 will be shifted in the opposite direction, or to the right from the dotted line position shown in Fig. 5. The first portion of the movement of this rod will cause the clutch ends 19, 20 to become inactive and will therefore release therefor the high speed engagement. A further movement of the rod 46 in the same direction will operate upon the dog 64 to apply the brake band. At the same time the cam or projection 45 will move against the dog 41 to swing it in a direction from the dotted line position to the full line position shown in Fig. 5, and the cushion or stop 49 will yield to permit the cam or projection to pass under the dog without tightening the band 15. A further movement in the same direction will release the band 14. The parts may then be allowed to remain in this position, when all the driving mechanism will be at rest except the driving shaft 10, which will operate as long as the engine operates. If now either the reverse or the low speed is desired, the rod 46 may be shifted in the respective directions. The rod 46 is also employed for moving the shifter 24 and for this purpose the shifter is provided on one end with a collar 67, which loosely surrounds the rod 46, the rod being preferably angular in cross section. In the present exemplification of the invention the means for shifting the collar consists preferably of a shoulder 68 (see particularly Fig. 1) formed on the rod 46 preferably by forming one portion of the rod larger than the other. This shoulder 68 is so positioned with respect to the cams or projections 45, 58 and the recesses 65, 47 that by the time the other drives or respective bands are released, the direct or high speed drive will be applied. The means for establishing an operative connection between the collar 67 and the rod 46 is also utilized for releasing the high speed clutch or compelling the collar 67 to return with the rod 46 when the latter is moved toward the right. A suitable means for this purpose comprises a dog 69 which is pivotally mounted by a pivot 70 upon the collar 67 so as to move therewith and is arranged to engage in a notch 71 formed in the rod 46 when the latter is pushed the necessary distance. The dog 69 is caused to enter the notch 71 by a cam or incline 72 formed on the main casing 13 when the shoulder 68 engages the collar 67 and moves the dog 69 into engagement with the incline 72. The dog 69 is held in the notch 71 during further movement of the rod 46 toward the left by engaging a surface 73, as shown more clearly in dotted lines in Fig. 5, on the casing arranged parallel with the rod and consequently when the release pull is imparted to the rod 46, it being desired to release the direct speed clutch, the dog 69 will compel the collar 67 to follow with the rod and to remain attached thereto until the incline 72 is again reached, whereupon the tail-piece 74 of the dog 69 will encounter a second incline 75 on the casing and positively release the dog 69 from the notch 71, thereby permitting the notch to rise within the collar and allowing the rod 46 its necessary freedom of movement for operating either of the dogs 41, 56, 64, without disturbing the collar 67. it being understood of course, that the parts are so proportioned and arranged that before the dogs are shifted, the direct speed clutch will have been released by the movement of the collar 67 toward the right. It will also be noted that the dog 69 constitutes a stop or lock for the collar 67 for holding it against longitudinal movement with the rod 46 until the shoulder 68 engages with the collar 67 and the dog has been forced into place in the notch 71, because the dog 69 is incapable of passing the incline 72 until the notch 71 registers therewith, consequently danger of applying the direct speed clutch while one of the bands 14, 15, 16 is applied is avoided. The rod 46 is slidably mounted in suitable guide passages formed in the casing and is preferably of angular cross-section so as to be held against rotation and to prevent the cams or projections 45, 58 and the recesses 65, 47 from getting out of line with their respective dogs.

In order to permit a free and easy rotation of the driven shaft 11, the latter is preferably mounted in ball bearings 76, as shown more clearly in Fig. 2.

What is claimed as new, is:

1. In a transmission gearing, the combination of a driving shaft, a driven shaft, mechanism for imparting motion from the driving to the driven shaft embodying a plurality of clutching or gripping devices each having a movable element for effecting a clutching or gripping action, a forwardly and backwardly movable actuating member having means for successively operating said elements at different points in its path of movement in one direction, and a braking mechanism also embodying a movable element for effecting a braking action, said actuating member also having means for operating the last recited element to effect a braking action at points in the path of movement of the actuating member intermediate the points of operation of the first recited means.

2. In a transmission gearing, the combination of a driving shaft, a driven shaft, mechanism for imparting motion from the driving to the driven shaft embodying a plurality of clutching or gripping devices each having a movable element for effecting a clutching or gripping action, a forwardly and backwardly movable actuating member having means for successively operating said elements at different points in its path of movement in one direction, and a braking mechanism also embodying a movable element for effecting a braking action, said actuating member also having means for operating the last recited element to effect a braking action at points in the path of movement of the actuating member in both directions and intermediate the points of operation of the first recited means.

3. In a transmission gearing, the combination of a driving shaft, a driven shaft, mechanism for imparting motion from the driving to the driven shaft embodying a plurality of clutching or gripping means, each having a movable element which when moved effects connection between the driving and driven shafts, each of said gripping or clutching means also embodying a swinging element, a frame or casing, an actuating slide movably supported by the latter and having means for engaging and shifting said elements at different points in the path of movement of the slide for effecting a gripping or clutching action, and means for preventing the operation of one of the said clutching or gripping means when the slide is moved in the opposite direction.

4. In a transmission gearing, the combination of a driving shaft, a driven shaft, mechanism for imparting motion from the driving to the driven shaft embodying a plurality of clutching or gripping means, each having a movable element which when moved effects connection between the driving and driven shafts, each of said gripping or clutching means also embodying a swinging element, a frame or casing, an actuating slide movably supported by the latter and having means for engaging and shifting said elements at different points in the path of movement of the slide for effecting a gripping or clutching action, means for preventing the operation of one of the said clutching or gripping means when the slide is moved in the opposite direction, and one or more yielding stops for each of the said swinging elements.

5. In a transmission gearing, the combination of a driving shaft, a driven shaft, mechanism for imparting motion from the driving to the driven shaft embodying a plurality of clutching or gripping means, each having a movable element which when moved effects connection between the driving and driven shafts, each of said gripping or clutching means also embodying a swinging element, a frame or casing, and an actuating slide movably supported by the latter and having means for engaging and shifting said element at different points in the path of movement of the slide for effecting a gripping or clutching action, one of said swinging elements being disposed to operate its clutching means at certain points in the path of movement of the slide in each of its forward and backward movements of the slide, and others of the swinging elements operating to effect a clutching action of its respective clutching means during one direction of movement only of the slide.

6. In a transmission gearing, the combination of a driving shaft, a driven shaft, mechanism for imparting motion from the driving to the driven shaft embodying a plurality of clutching or gripping means, each having a movable element which when moved effects connection between the driving and driven shafts, each of said gripping or clutching means also embodying a swinging element, a frame or casing, an actuating slide movably supported by the latter and having means for engaging and shifting said elements at different points in the path of movement of the slide for effecting a gripping or clutching action, said slide having a recessed portion for the reception of one of the said swinging elements to prevent the operation of the respective clutching or gripping means when the slide is moved in one direction.

7. In a transmission gearing, the combination of a driving shaft, a driven shaft, mechanism for imparting motion from the driving to the driven shaft embodying a plurality of gripping or clutching means, each having a movable element which when moved effects connection between the driving and driven shafts, each of said gripping or clutching means also embodying a controlling element, a support, an actuating member carried by the support and having means for engaging and shifting the controlling element at different points in the path of movement of the slide for effecting a gripping or clutching action when the member is moved, and means for preventing the operation of one of the said clutching or gripping means when the actuating member is moved in one direction.

In testimony whereof I have signed my name to this specification, in the presence of two subscribing witnesses, on this 1st day of June A. D. 1912.

GEORGE W. BULLEY.

Witnesses:
J. H. JOCHUM, Jr.,
C. H. SEEM.